US009460847B2

(12) United States Patent
Lee et al.

(10) Patent No.: US 9,460,847 B2
(45) Date of Patent: Oct. 4, 2016

(54) SOFT MAGNETIC LAYER, RECEIVING ANTENNA, AND WIRELESS POWER RECEIVING APPARATUS COMPRISING THE SAME

(71) Applicant: LG INNOTEK CO., LTD., Seoul (KR)

(72) Inventors: Sang Won Lee, Seoul (KR); So Yeon Kim, Seoul (KR); Jin Mi Noh, Seoul (KR); Seok Bae, Seoul (KR); Jai Hoon Yeom, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 289 days.

(21) Appl. No.: 14/147,193

(22) Filed: Jan. 3, 2014

(65) Prior Publication Data

US 2014/0191716 A1    Jul. 10, 2014

(30) Foreign Application Priority Data

Jan. 4, 2013  (KR) .................. 10-2013-0001129

(51) Int. Cl.
*H01F 38/14* (2006.01)
*H02J 7/02* (2016.01)
*H01Q 7/08* (2006.01)

(52) U.S. Cl.
CPC ............. *H01F 38/14* (2013.01); *H01Q 7/08* (2013.01); *H02J 7/025* (2013.01); *Y10T 428/12472* (2015.01); *Y10T 428/12958* (2015.01)

(58) Field of Classification Search
CPC .............................. H01F 38/14; H02J 7/025
USPC .................. 320/108; 307/104; 428/682, 612
See application file for complete search history.

(56) References Cited

U.S. PATENT DOCUMENTS

| 6,180,868 | B1* | 1/2001 | Yoshino | H01L 31/0392 136/244 |
|---|---|---|---|---|
| 9,112,364 | B2* | 8/2015 | Partovi | H02J 7/025 |
| 2003/0190498 | A1* | 10/2003 | Fujieda | H01L 23/552 428/8 |
| 2004/0183733 | A1* | 9/2004 | Aoyama | H01Q 1/243 343/702 |
| 2006/0157798 | A1* | 7/2006 | Hayashi | H01L 21/8221 257/374 |
| 2009/0128437 | A1 | 5/2009 | Sonoda et al. | |
| 2010/0303731 | A1* | 12/2010 | Hyde | A61K 49/1818 424/9.36 |
| 2014/0191716 | A1* | 7/2014 | Lee | H01Q 7/08 320/108 |

FOREIGN PATENT DOCUMENTS

JP    2002-175921 A    6/2002

OTHER PUBLICATIONS

European Search Report dated Apr. 1, 2014 in European Application No. 14150156.

(Continued)

*Primary Examiner* — Edward Tso
*Assistant Examiner* — Dung V Bui
(74) *Attorney, Agent, or Firm* — Saliwanchik, Lloyd & Eisenschenk

(57) ABSTRACT

A soft magnetic layer for a receiving antenna of a wireless power receiving apparatus includes a first soft magnetic member containing a Mn—Zn ferrite material, and a second soft magnetic member containing a Ni—Zn ferrite material. Accordingly, electromagnetic energy collecting performance of the receiving antenna of the wireless power receiving apparatus is improved, and thereby power transmission efficiency is maximized.

10 Claims, 5 Drawing Sheets

(56) References Cited

OTHER PUBLICATIONS

Ravinder D., et al., "Electrical Conductivity of Mn—Zn Ferrites," Journal of Applied Physics, American institute of Physics, vol. 75, No. 10, Part 02A, May 15, 1994, pp. 6118-6120.

Kimura, O., et al., "Formation of Commercial Mn—Zn Ferrites," United Thermal Spray Conference, Jan. 1, 1985, pp. 115-119.

\* cited by examiner

SOFT MAGNETIC LAYER, RECEIVING ANTENNA, AND WIRELESS POWER RECEIVING APPARATUS COMPRISING THE SAME

CROSS-REFERENCE TO RELATED APPLICATION

This application claims the benefit of Korean Patent Application No. 10-2013-0001129, filed Jan. 4, 2013, which is incorporated herein by reference in its entirety.

BACKGROUND

1. Field of the Invention

The present invention relates to a wireless power transmitting/receiving apparatus. More particularly, the present invention relates to a soft magnetic layer, and a receiving antenna and wireless power receiving apparatus including the same.

2. Discussion of Related Art

As wireless communication technology develops, there is increasing interest in wireless power transmitting/receiving technology in which power is wirelessly supplied to an electronic apparatus. The wireless power transmitting/receiving technology may be variously applied in power supply to home electronics, electric cars, subway cars, etc. as well as battery charging of portable terminals.

In a common wireless power transmitting/receiving technology, the principle of magnetic induction or magnetic resonance is used. For example, when electric energy is applied to a transmission antenna of a wireless power transmission apparatus, the transmission antenna converts the electric energy to electromagnetic energy, and radiates the electromagnetic energy. In addition, a receiving antenna of a wireless power receiving apparatus receives the electromagnetic energy radiated from the transmission antenna, and converts the electromagnetic energy to electric energy.

Here, in order to increase power transmitting/receiving efficiency, energy loss between the wireless power transmission apparatus and the wireless power receiving apparatus needs to be minimized. To do this, the transmission antenna and the receiving antenna need to be mutually aligned within an effective distance. In addition, the electromagnetic energy radiated from the transmission antenna needs to be collected in a direction of the receiving antenna by configuring the transmission antenna and the receiving antenna to include a soft magnetic material.

The soft magnetic material for the receiving antenna may be changed depending on the location of transmission antenna, the type of soft magnetic material for the transmission antenna, the effect of a permanent magnet included in the wireless power transmission apparatus, etc.

Generally, as the soft magnetic material for the receiving antenna, a composite containing a metallic material (e.g. Fe—Si—Al, Fe—Si—Cr, and Fe—Si—B) having soft magnetic characteristics, a resin, and an additive, or a Ni—Zn ferrite material may be used. When using the composite containing the metallic material, there are problems in that a required level of power transmission efficiency is not obtained, and the price is high. In addition, when using the Ni—Zn ferrite material, although high frequency characteristics are good, there is a problem in that low frequency characteristics are not good.

SUMMARY OF THE INVENTION

The present invention is directed to provide a soft magnetic layer, and a receiving antenna and wireless power receiving apparatus including the same.

According to an aspect of the present invention, there is provided a soft magnetic layer for a receiving antenna of a wireless power receiving apparatus, which wirelessly charges with power, including a first soft magnetic member containing a Mn—Zn ferrite material, and a second soft magnetic member containing a Ni—Zn ferrite material.

The first soft magnetic member may be formed on the second soft magnetic member. The second soft magnetic member may surround an edge of the first soft magnetic member.

The first soft magnetic member may surround an edge of the second soft magnetic member.

A groove may be formed on the second soft magnetic member, and the first soft magnetic member may be seated on the groove.

A groove may be formed on the first soft magnetic member, and the second soft magnetic member is seated on the groove.

A fixing member may be further formed on at least one of an upper surface and a lower surface of the first soft magnetic member or the second soft magnetic member, and configured to fix the first soft magnetic member or the second soft magnetic member.

The Mn—Zn ferrite may include at least one of $Mn_{1-x}Zn_xFe_2O_4$ ($0 \leq x < 1$) and $Mn_{1-x-y}Zn_xFe_yFe_{2-y}O_4$ ($0 \leq x < 1$, $0 \leq y < 1$).

The soft magnetic layer may be formed as at least one of a sheet, a plate, and a pellet.

The ratio of the area of the second magnetic member to the first soft magnetic member may be 0.001 to 2.

The ratio of the area of the first magnetic member to the second soft magnetic member may be 0.001 to 2.

According to another aspect of the present invention, there is provided a receiving antenna of a wireless power receiving apparatus which wirelessly charges with power, including a substrate, a soft magnetic layer containing a first soft magnetic member containing a Mn—Zn ferrite material and a second soft magnetic member containing a Ni—Zn ferrite material, which are formed on the substrate, and a receiving coil formed on the soft magnetic layer.

According to still another aspect of the present invention, there is provided a wireless power receiving apparatus which wirelessly charges with power, including a substrate, a soft magnetic layer containing a first soft magnetic member containing a Mn—Zn ferrite material and a second soft magnetic member containing a Ni—Zn ferrite material, which are formed on the substrate, a receiving coil formed on the soft magnetic layer, a circuit connected to the receiving coil, and configured to convert electromagnetic energy to electric energy, and a storage member configured to store the electric energy.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various embodiments will now be described more fully with reference to the accompanying drawings in which some embodiments are shown. Like numerals refer to like elements throughout, and duplicate descriptions thereof will be omitted.

Figure 1:
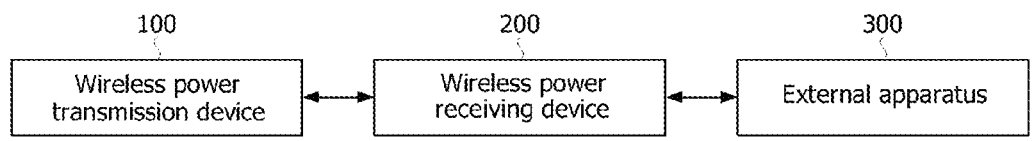
FIG. 1 is a block diagram showing a wireless power transmitting/receiving system according to an embodiment of the present invention.

FIG. 1 is a block diagram showing a wireless power transmitting/receiving system according to an embodiment of the present invention.

Referring to FIG. 1, the wireless power transmitting/receiving system includes a wireless power transmission apparatus 100 and a wireless power receiving apparatus 200. The wireless power transmission apparatus 100 applies electric energy to a transmission antenna, and the transmission antenna converts the electric energy to electromagnetic energy and radiates the electromagnetic energy. The wireless power receiving apparatus 200 receives the electromagnetic energy radiated from the transmission antenna using a receiving antenna, converts the electromagnetic energy to electric energy, and charges.

Here, the wireless power transmission apparatus 100 is, for example, a transmission pad. In addition, the wireless power receiving apparatus 200 may be a part of a portable terminal, a home/personal electronic appliance, a transport vehicle, etc. to which a wireless power transmitting/receiving technology is applied. The mobile terminal, the home/personal electronic appliance, the transport vehicle, etc. to which a wireless power transmitting/receiving technology is applied may be set to include the wireless power receiving apparatus 200 only, or both of the wireless power transmission apparatus 100 and the wireless power receiving apparatus 200.

Meanwhile, the wireless power receiving apparatus 200 may be configured to have a module having a wireless power conversion (WPC) function and a near field communication (NFC) function at the same time. In this case, the wireless power receiving apparatus 200 may perform near field wireless communication with an external apparatus 300 having an NFC module.

Figure 2:
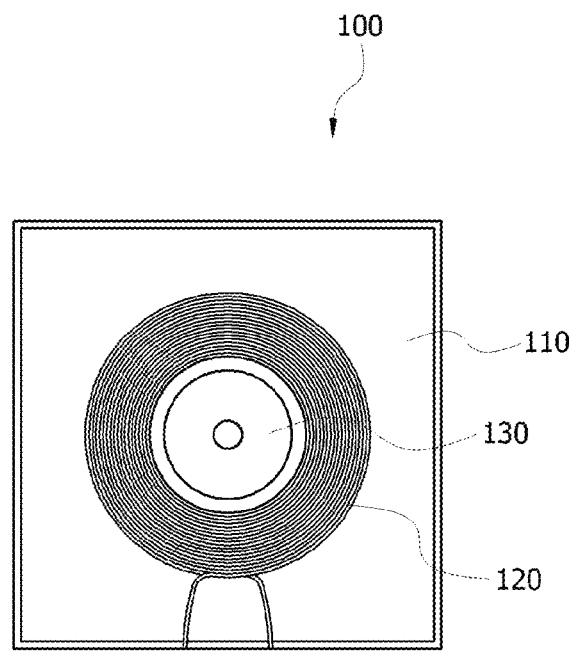
FIG. 2 is a diagram showing a part of a wireless power transmission apparatus, and FIG. 3 a diagram showing a part of a wireless power receiving apparatus.
Figure 3:
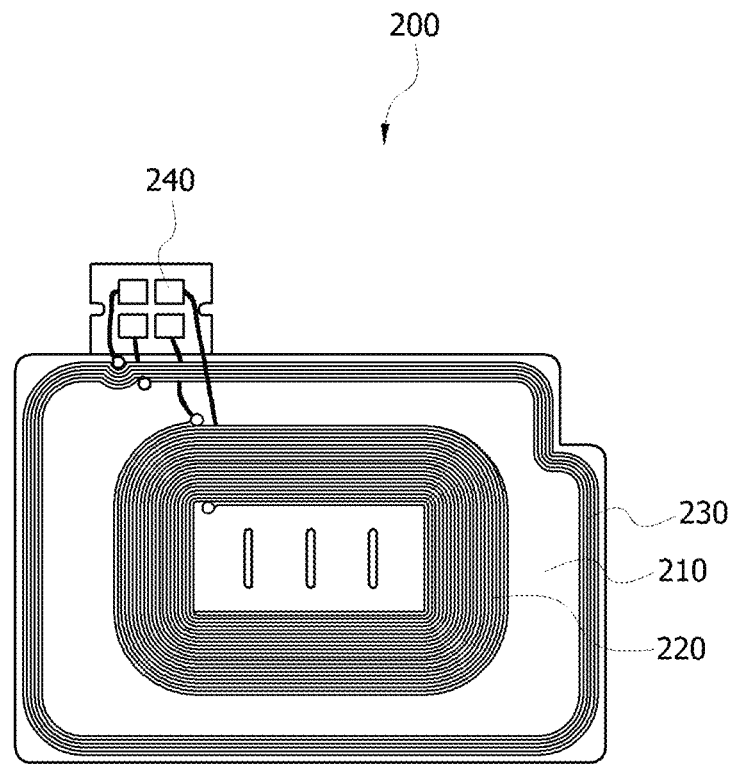

FIG. 2 is a diagram showing a part of a wireless power transmission apparatus, and FIG. 3 a diagram showing a part of a wireless power receiving apparatus.

Referring to FIG. 2, the wireless power transmission apparatus 100 includes a transmission circuit (not shown), a soft magnetic core 110, a transmission antenna 120, and a permanent magnet 130.

The soft magnetic core 110 may be formed of a soft magnetic material having a thickness of several millimeters. In addition, the transmission antenna 120 may be formed of a transmission coil. The permanent magnet 130 may be surrounded by the transmission antenna 120.

Referring to FIG. 3, the wireless power receiving apparatus 200 includes a receiving circuit (not shown), a soft magnetic layer 210, and a receiving coil 220. The soft magnetic layer 210 may be formed on a substrate (not shown). The substrate may be formed of several layers of fixing sheets, and bonded with the soft magnetic layer 210 to fix the soft magnetic layer 210.

The soft magnetic layer 210 collects electromagnetic energy radiated from the transmission antenna 120 of the wireless power transmission apparatus 100.

The receiving coil 220 is formed on the soft magnetic layer 210. The receiving coil 220 may be formed of a coil plane coiled in a parallel direction to the soft magnetic layer 210 on the soft magnetic layer 210. A receiving antenna applied to a smartphone, for example, has a shape of a spiral coil having an outer diameter of 50 mm or less, and an inner diameter of 20 mm or more. The receiving circuit converts electromagnetic energy received through the receiving coil 220 to electric energy, and charges a battery (not shown)

with the converted electric energy. In the present specification, the soft magnetic layer 210 and the receiving coil 220 may be referred to as a receiving antenna.

When the wireless power receiving apparatus 200 has a WPC function and an NFC function at the same time, an NFC coil 230 may be further stacked on the soft magnetic layer 210. The NFC coil 230 may be formed to surround the outside of the receiving coil 220.

In addition, each of the receiving coil 220 and the NFC coil 230 may be electrically connected via a terminal 240.

Generally, the soft magnetic layer 210 may be formed of a composite containing a metallic material (e.g. Fe—Si—Al, Fe—Si—Cr, and Fe—Si—B) having a soft magnetic property, a resin, and an additive, or a Ni—Zn ferrite material. When using the composite containing the metallic material, there are problems in that a required level of power transmission efficiency is not obtained, and the price is high. In addition, when using the Ni—Zn ferrite material, although high frequency characteristics are good, there is a problem in that low frequency characteristics are not good.

According to the embodiment of the present invention, the soft magnetic layer 210 for the receiving antenna of the wireless power receiving apparatus 200 includes a Mn—Zn ferrite material. The Mn—Zn ferrite material has high magnetic permeability and good characteristics at a low frequency band (e.g. 50 to 500 kHz, preferably 110 to 250 kHz) mainly used for wireless power transmission/reception.

Figure 4:
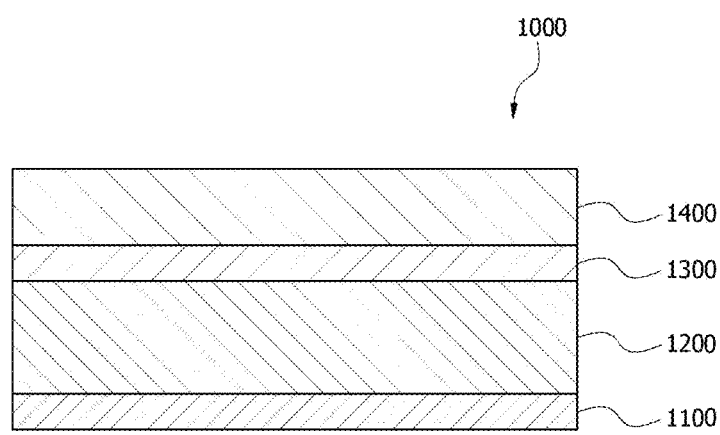
FIG. 4 is a partial cross-sectional view showing a wireless power receiving apparatus according to an embodiment of the present invention.

FIG. 4 is a partial cross-sectional view showing a wireless power receiving apparatus according to an embodiment of the present invention.

Referring to FIG. 4, the wireless power receiving apparatus 1000 includes a substrate 1100, a soft magnetic layer 1200 formed on the substrate 1100, a heat radiating layer 1300 formed on the soft magnetic layer 1200, and a receiving coil 1400 formed on the heat radiating layer 1300.

The substrate 1100 may be formed of several layers of fixing sheets, and bonded with the soft magnetic layer 1200 to fix the soft magnetic layer 1200. However, the substrate 1100 is not an essential component of the wireless power receiving apparatus 1000, and may be omitted.

The soft magnetic layer 1200 may include a Mn—Zn ferrite material. The Mn—Zn ferrite has good characteristics at a low frequency band, and magnetic permeability of 1 to 15000. Accordingly, when the Mn—Zn ferrite is used as a soft magnetic layer for a receiving antenna of a wireless power receiving apparatus in the wireless power transmission/reception technology in which a low frequency band (e.g. 50 to 500 kHz) is mainly used, power transmission efficiency can be maximized.

The Mn—Zn ferrite material may be, for example, $Mn_{1-x}Zn_xFe_2O_4$ (0≤x<1) or $Mn_{1-x-y}Zn_xFe_yFe_{2-y}O_4$ (0≤x<1, 0≤y<1).

The Mn—Zn ferrite material, that is, $Mn_{1-x}Zn_xFe_2O_4$ (0≤x<1) or $Mn_{1-x-y}Zn_xFe_yFe_{2-y}O_4$ (0≤x<1, 0≤y<1), contained in the soft magnetic layer 1200, may be included at 60 wt % or more, preferably 70 wt % or more with respect to the entire soft magnetic layer 1200. When the Mn–Zn ferrite material is included at 60 wt % or more of the soft magnetic layer 1200, a required level of power transmission efficiency can be obtained even at a low frequency band.

In addition, the sum of Mn, Zn, Fe, and O contained in the soft magnetic layer 1200 may be 70 wt % or more, preferably 80 wt % or more with respect to the entire soft magnetic layer 1200. When the sum of Mn, Zn, Fe, and O is 70 wt % or more of the soft magnetic layer 1200, a required level of power transmission efficiency can be obtained even at a low frequency band.

The soft magnetic layer 1200 may further include at least one substituted element (a metal and/or non-metal element), an additive, a binder, or a resin for changing characteristics of the Mn—Zn ferrite.

Figure 5:
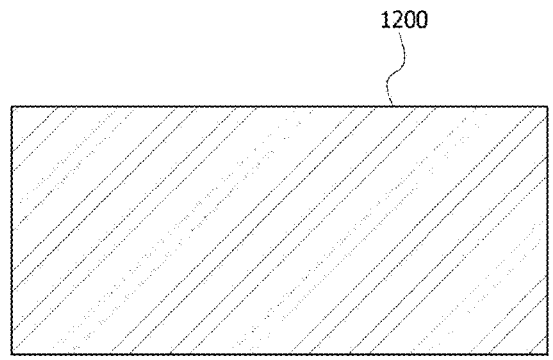
FIG. 5 is a top view showing a soft magnetic layer according to an embodiment of the present invention.

FIG. 5 is a top view showing a soft magnetic layer 1200 according to an embodiment of the present invention. Referring to FIG. 5, the soft magnetic layer 1200 is illustrated as being a rectangle, but is not limited thereto. The soft magnetic layer 1200 may have a circular, elliptical, or polygonal shape, etc.

Referring again to FIG. 4, the soft magnetic layer 1200 may be formed to have a sheet, plate, or pellet shape. Here, a sheet is a flexible structure, a plate is a more rigid structure than a sheet, and a pellet is a structure that is more rigid than a sheet and formed at a high temperature after pressing the material. When the soft magnetic layer 1200 is implemented as a sheet, the thickness of the sheet is 0.05 mm to 1.00 m, and the area of the sheet is 2.0 mm$^2$ to 3.3 m$^2$. At this time, the soft magnetic layer 1200 may be configured as a single sheet, or a structure in which two or more sheets are stacked or arranged.

Meanwhile, the heat spreading layer 1300 may prevent performance degradation due to heat generated from the wireless power receiving apparatus 1000.

For convenience of description, the receiving coil 1400 is illustrated as being stacked on the heat radiating layer 1300, but the embodiments of the present invention are not limited thereto. The receiving coil 1400 may be located under the substrate 1100, between the substrate 1100 and the soft magnetic layer 1200, between the soft magnetic layer 1200 and the heat radiating layer 1300, or beside the soft magnetic layer 1200, etc.

Figure 6:
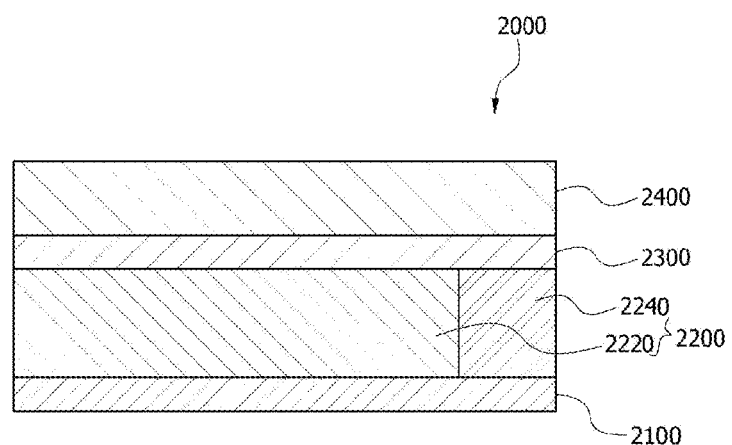
FIG. 6 is a partial cross-sectional view showing a wireless power receiving apparatus according to another embodiment of the present invention.

FIG. 6 is a partial cross-sectional view of a wireless power receiving apparatus according to another embodiment of the present invention.

Referring to FIG. 6, a wireless power receiving apparatus 2000 includes a substrate 2100, a soft magnetic layer 2200 formed on the substrate 2100, a heat radiating layer 2300 formed on the soft magnetic layer 2200, and a receiving coil 2400 formed on the heat radiating layer 2300.

Since information about the substrate 2100, the heat radiating layer 2300, and the receiving coil 2400 is the same as described in FIG. 1, duplicate description will be omitted. With regard to the soft magnetic layer 2200, description duplicated from FIG. 1 will be also omitted.

The soft magnetic layer 2200 may include a soft magnetic member 2220 containing a Mn—Zn ferrite material, and a soft magnetic member 2240 containing a Ni—Zn ferrite material.

The Mn—Zn ferrite has good characteristics at a low frequency band, and a magnetic permeability ($\mu_r$) of one to 15000. In addition, the Ni—Zn ferrite has good characteristics at a high frequency band, and a magnetic permeability ($\mu_r$) of one to 1000. Accordingly, when the soft magnetic member 2220 containing the Mn—Zn ferrite material and the soft magnetic member 2240 containing the Ni—Zn ferrite material are used together, the soft magnetic layer 2200 may be applied to various frequency bands.

Here, the Mn—Zn ferrite material may include $Mn_{1-x}Zn_xFe_2O_4$ (0≤x<1) or $Mn_{1-x-y}Zn_xFe_yFe_{2-y}O_4$ (0≤x<1, 0≤y<1). In addition, the Ni—Zn ferrite material may include $Ni_{1-x}Zn_xFe_2O_4$ (0≤x<1) or $Ni_{1-x-y}Zn_xFe_yFe_{2-y}O_4$ (0≤x<1, 0≤y<1).

The Mn—Zn ferrite material, that is, $Mn_{1-x}Zn_xFe_2O_4$ ($0 \leq x < 1$) or $Mn_{1-x-y}Zn_xFe_yFe_{2-y}O_4$ ($0 \leq x < 1$, $0 \leq y < 1$), contained in the soft magnetic layer 2200, may be included at 60 wt % or more, preferably 70 wt % or more with respect to the entire soft magnetic layer 1200. When the Mn—Zn ferrite material is included at 60 wt % or more of the soft magnetic layer 2200, a required level of power transmission efficiency can be obtained even at a low frequency band.

In addition, the sum of Mn, Zn, Fe, and O contained in the soft magnetic layer 2200 may be 70 wt % or more, preferably 80 wt % or more with respect to the entire soft magnetic layer 2200. When the sum of Mn, Zn, Fe, and O is 70 wt % or more of the soft magnetic layer 2200, a required level of power transmission efficiency can be obtained even at a low frequency band.

Figure 7:
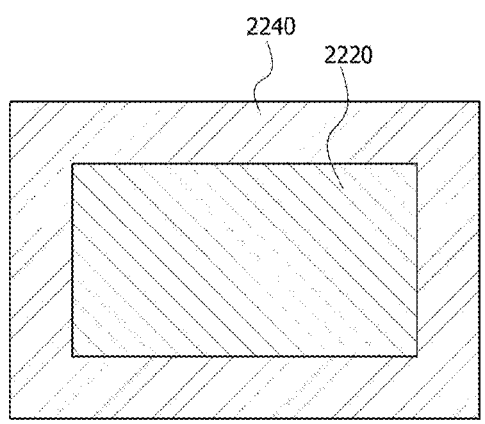
FIG. 7 is a top view showing a soft magnetic layer according to another embodiment of the present invention.

FIG. 7 is a top view showing a soft magnetic layer 2200 according to another embodiment of the present invention. Referring to FIG. 7, the soft magnetic layer 2200 is illustrated as being a rectangle, but is not limited thereto. The soft magnetic layer 2200 may have a circular, elliptical, or polygonal shape, etc.

The soft magnetic member 2240 containing the Ni—Zn ferrite material contained in the soft magnetic layer 2200 surrounds the edge of the soft magnetic member 2220 containing the Mn—Zn ferrite material. In the present specification, the soft magnetic layer 2200 in which the soft magnetic member 2220 containing the Mn—Zn ferrite material and the soft magnetic member 2240 containing the Ni—Zn ferrite material may be referred to as a Mn—Zn/Ni—Zn hybrid structure.

The soft magnetic layer 2200 may be implemented as a sheet, a plate, or a pellet, etc.

Figure 8:
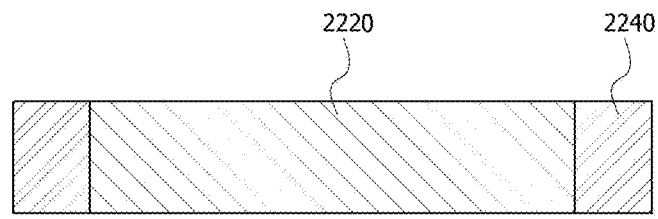
FIGS. 8 to 10 are an exemplary embodiment of a Mn—Zn/Ni—Zn hybrid structure of a soft magnetic layer according to another embodiment of the present invention.
Figure 9:
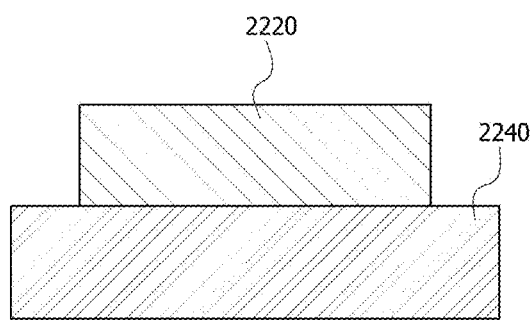
Figure 10:
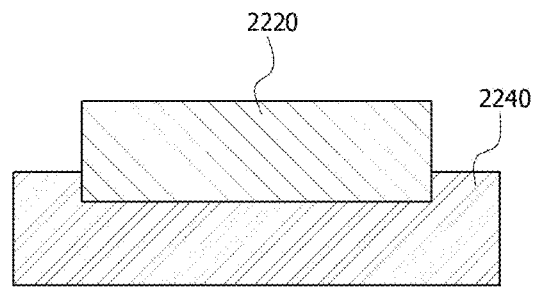

FIGS. 8 to 10 are an exemplary embodiment of a Mn—Zn/Ni—Zn hybrid structure of a soft magnetic layer according to an embodiment of the present invention.

Referring to FIG. 8, a hole is formed in the center of a soft magnetic member 2240 containing a Ni—Zn ferrite material, and a soft magnetic member 2220 containing the Mn—Zn ferrite material may be located in the hole. Here, the ratio of the area of the soft magnetic member 2220 containing the Mn—Zn ferrite material with respect to the area of the entire soft magnetic layer 2200 may be set variously depending on a required power transmission efficiency and a frequency band for transmitting/receiving electromagnetic energy. For example, when power transmission efficiency of 50% or more is required in a frequency band of 50 to 500 kHz, the area ratio of the soft magnetic member 2240 containing the Ni—Zn ferrite material with respect to the soft magnetic member 2220 containing the Mn—Zn ferrite material may be 0.001 to 2.0, preferably 0.001 to 1.5. As another example, when power transmission efficiency of 50% or more is required in a frequency band of 1000 kHz to 1 GHz, the area ratio of the soft magnetic member 2220 containing the Mn—Zn ferrite material with respect to the soft magnetic member 2240 containing the Ni—Zn ferrite material is 0.001 to 2.0, preferably 0.001 to 1.5.

Meanwhile, the thicknesses of the soft magnetic member 2220 containing the Mn—Zn ferrite material and the soft magnetic member 2240 containing the Ni—Zn ferrite material may be set variously depending on required power transmission efficiency and a frequency band for transmitting/receiving electromagnetic energy. For example, when power transmission efficiency of 50% or more is required in a frequency band of 50 to 500 kHz, the thickness ratio of the soft magnetic member 2240 containing the Ni—Zn ferrite material with respect to the soft magnetic member 2220 containing the Mn—Zn ferrite material Mn—Zn ferrite may be 0.001 to 2.5, preferably 0.001 to 2.0. As another example, when power transmission efficiency of 50% or more is required in a frequency band of 1000 kHz to 1 GHz, the thickness ratio of the soft magnetic member 2240 containing the Ni—Zn ferrite material with respect to the soft magnetic member 2220 containing the Mn—Zn ferrite material is 0.001 to 2.5, preferably 0.001 to 2.0.

Meanwhile, when the thickness of the soft magnetic member 2240 containing the Ni—Zn ferrite material is set to be smaller than the thickness of the soft magnetic member 2220 containing the Mn—Zn ferrite material, a fixing sheet for fixing the soft magnetic member 2240 containing the Ni—Zn ferrite material may be added on and/or below the soft magnetic member 2240 containing the Ni—Zn ferrite material.

Likewise, when the thickness of the soft magnetic member 2220 containing the Mn—Zn ferrite material is set to be smaller than the thickness of the soft magnetic member 2240 containing the Ni—Zn ferrite material, a fixing sheet for fixing the soft magnetic member 2220 containing the Mn—Zn ferrite material may be added above and/or below the soft magnetic member 2220 containing the Mn—Zn ferrite material.

Although not shown, a plurality of holes may be formed in the soft magnetic member 2240 containing the Ni—Zn ferrite material, and the soft magnetic member 2220 containing the Mn—Zn ferrite material may be located in each hole.

A hole may be formed in the center of the soft magnetic member containing the Mn—Zn ferrite material, and the soft magnetic member containing the Ni—Zn ferrite material may be located in the hole.

Referring to FIG. 9, the soft magnetic member 2220 containing the Mn—Zn ferrite may be formed on the soft magnetic member 2240 containing the Ni—Zn ferrite material. The ratio of the area of soft magnetic member 2220 containing Mn—Zn ferrite with respect to the area of the entire soft magnetic layer 2200, and the ratio of the thickness of soft magnetic member 2220 containing Mn—Zn ferrite with respect to the thickness of soft magnetic member 2240 containing Ni—Zn ferrite may be set variously depending on a required power transmission efficiency and a frequency band for transmitting/receiving electromagnetic energy.

A soft magnetic member containing Ni—Zn ferrite may be formed on a soft magnetic member containing Mn—Zn ferrite.

Referring to FIG. 10, a groove may be formed on a soft magnetic member 2240 containing Ni—Zn ferrite, and a soft magnetic member 2220 containing Mn—Zn ferrite may be seated on the groove. Just like FIG. 9, the ratio of the area of soft magnetic member 2220 containing Mn—Zn ferrite with respect to the entire area of soft magnetic layer 2200, and the ratio of the thickness of soft magnetic member 2220 containing Mn—Zn ferrite with respect to the thickness of soft magnetic member 2240 containing Ni—Zn ferrite may be set variously depending on a required power transmission efficiency and a frequency band for transmitting/receiving electromagnetic energy.

A groove may be formed on a soft magnetic member containing Mn—Zn ferrite, and a soft magnetic member containing Ni—Zn ferrite may be seated on the groove.

Figure 11:
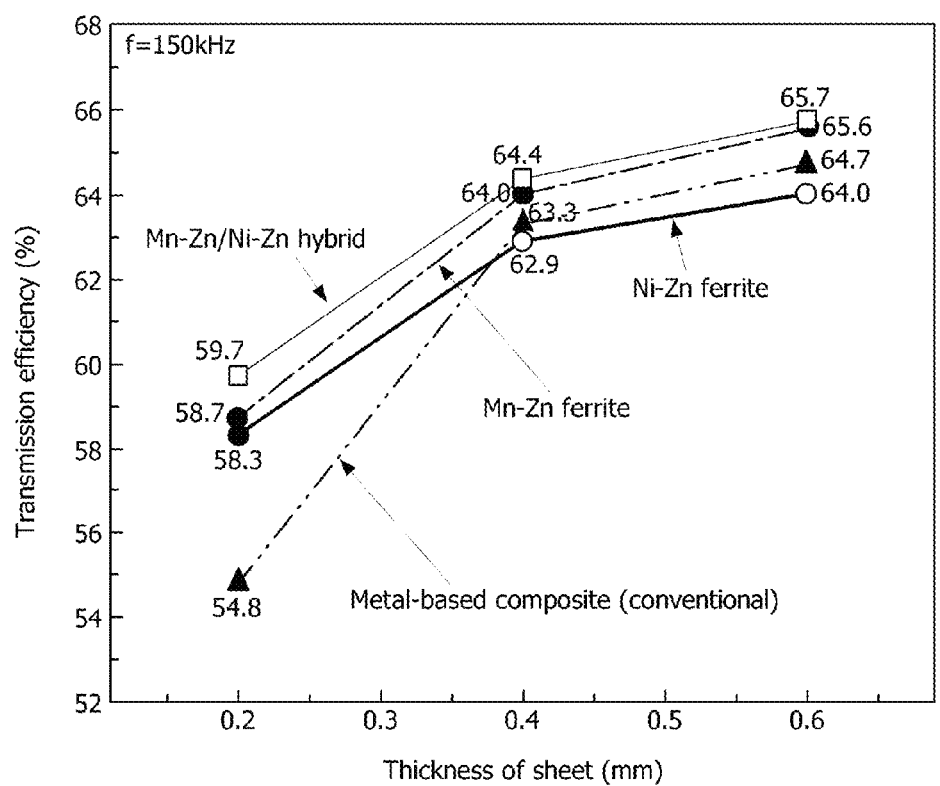
FIG. 11 shows transmission efficiency of a soft magnetic layer for a receiving antenna of a wireless power receiving apparatus according to an embodiment of the present invention.

FIG. 11 shows transmission efficiency of a soft magnetic layer for a receiving antenna of a wireless power receiving apparatus according to an embodiment of the present invention. In a Mn—Zn ferrite structure, $Mn_{0.7}Zn_{0.24}Fe_{2.06}O_4$ was used. In a Mn—Zn/Ni—Zn hybrid structure, $Mn_{0.7}Zn_{0.24}Fe_{2.06}O_4$ and $Ni_{0.35}Zn_{0.65}Fe_2O_4$ were used, and the ratio of the thickness of Ni—Zn ferrite to Mn—Zn ferrite was 0.5. Power transmission efficiency was measured at a 150 kHz frequency band in a condition in which a battery was installed by a TX-A1 (a magnetic induction type including a permanent magnet) transmitter according to a "Qi" standard established by the Wireless Power Consortium (WPC).

Referring to FIG. 11, when the soft magnetic layer for the receiving antenna of the wireless power receiving apparatus includes the Mn—Zn ferrite material, high power transmission efficiency is shown compared to when an existing metal material composite or a Ni—Zn ferrite material is included. In particular, the power transmission efficiency was 58% or more even at a small thickness (0.2 mm). Accordingly, the soft magnetic layer according to the embodiment of the present invention can be applied to a mobile terminal and a home/personal electronic apparatus which are trending toward slimness. In addition, when the thickness of sheet is 0.5 mm or more, the power transmission efficiency is 64% or more. Accordingly, if increasing power transmission efficiency is a higher priority than slimness, the power transmission efficiency can be increased by forming the sheet to be thicker.

In addition, it is found that the soft magnetic layer (Mn—Zn/Ni—Zn hybrid) according to the embodiment in FIG. 6 has higher power transmission efficiency than the soft magnetic layer (Mn—Zn ferrite only) according to the embodiment in FIG. 4. That is, a Mn—Zn/Ni—Zn hybrid structure can be applied in order to obtain high power transmission efficiency with a sheet having a small thickness.

According to the embodiments of the present invention, power transmission efficiency can be maximized by improving electromagnetic energy collecting performance of a receiving antenna in a wireless power receiving apparatus. In particular, high magnetic permeability and high power transmission efficiency can be obtained at a low frequency band mainly used for wireless power transmission/reception.

In addition, since a required level of an electromagnetic energy collecting effect is obtained even at a small thickness, the embodiments of the present invention can be applied to a variety of electronic apparatuses which are trending toward slimness (for example, a TV, a portable terminal, a laptop computer, a tablet PC, etc.).

Further, due to excellent electromagnetic energy collecting performance and a low price, the embodiments of the present invention can be applied to large-scale applications, such as electric cars, subway cars, trains, etc.

Further, even when the wireless power transmission apparatus includes a permanent magnet, high power transmission efficiency can be obtained by absorbing the impact of the permanent magnet. In addition, even when the wireless power transmission apparatus does not include a permanent magnet, the wireless power transmission apparatus has compatibility.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A soft magnetic layer for a receiving antenna of a wireless power receiving apparatus, comprising:
   a first soft magnetic member containing a Mn—Zn ferrite material, and a second soft magnetic member containing a Ni—Zn ferrite material;
   wherein one of the first soft magnetic member and the second soft magnetic member is formed on the other soft magnetic member, or one of the first soft magnetic member and the second soft magnetic member surrounds an edge of the other soft magnetic member.

2. The soft magnetic layer of claim 1, wherein the second soft magnetic member has a groove formed thereon, and the first soft magnetic member is seated on the groove.

3. The soft magnetic layer of claim 1, wherein the first soft magnetic member has a groove formed thereon, and the second soft magnetic member is seated on the groove.

4. The soft magnetic layer of claim 1, further comprising a fixing member formed on at least one of an upper surface and a lower surface of the first soft magnetic member or the second soft magnetic member, and configured to fix the first soft magnetic member or the second soft magnetic member.

5. The soft magnetic layer of claim 1, wherein the Mn—Zn ferrite includes at least one of $Mn_{1-x}Zn_xFe_2O_4$ (0≤x<1) and $Mn_{1-x-y}Zn_xFe_yFe_{2-y}O_4$ (0≤x<1, 0≤y<1).

6. The soft magnetic layer of claim 1, wherein the soft magnetic layer is formed as at least one of a sheet, a plate, and a pellet.

7. The soft magnetic layer of claim 1, wherein the ratio of the area of the second magnetic member to the first soft magnetic member is 0.001 to 2.

8. The soft magnetic layer of claim 1, wherein the ratio of the area of the first magnetic member to the second soft magnetic member is 0.001 to 2.

9. A receiving antenna of a wireless power receiving apparatus which wirelessly charges with power, comprising:
   a substrate;
   a soft magnetic layer containing a first soft magnetic member containing a Mn—Zn ferrite material and a second soft magnetic member containing a Ni—Zn ferrite material, which are formed on the substrate; and
   a receiving coil formed on the soft magnetic layer.

10. A wireless power receiving apparatus which wirelessly charges with power, comprising:
    a substrate;
    a soft magnetic layer containing a first soft magnetic member containing a Mn—Zn ferrite material and a second soft magnetic member containing a Ni—Zn ferrite material, which are formed on the substrate;
    a receiving coil formed on the soft magnetic layer;
    a circuit connected to the receiving coil, and configured to convert electromagnetic energy to electric energy; and
    a storage member configured to store the electric energy.

* * * * *